United States Patent
Anghel et al.

(10) Patent No.: US 7,184,927 B2
(45) Date of Patent: Feb. 27, 2007

(54) ADAPTIVE POSITION SENSING METHOD AND APPARATUS FOR SYNCHRONOUS MOTOR GENERATOR SYSTEM

(75) Inventors: Cristian E. Anghel, Mississauga (CA); Rocco DiVito, Etobicoke (CA); Nicolae Morcov, Mississauga (CA)

(73) Assignee: Honeywell International Inc., Morristown, NJ (US)

(*) Notice: Subject to any disclaimer, the term of this patent is extended or adjusted under 35 U.S.C. 154(b) by 43 days.

(21) Appl. No.: 10/809,402

(22) Filed: Mar. 26, 2004

(65) Prior Publication Data

US 2005/0216225 A1 Sep. 29, 2005

(51) Int. Cl.
*G01C 1/00* (2006.01)

(52) U.S. Cl. ............... 702/151; 318/439

(58) Field of Classification Search ............ 702/94, 702/151
See application file for complete search history.

(56) References Cited

U.S. PATENT DOCUMENTS

| | | | |
|---|---|---|---|
| 5,036,264 A | 7/1991 | Ueki | |
| 5,166,583 A | 11/1992 | Min et al. | |
| 5,384,527 A | 1/1995 | Rozman et al. | |
| 5,493,200 A * | 2/1996 | Rozman et al. | 322/10 |
| 5,495,162 A | 2/1996 | Rozman et al. | |
| 5,518,373 A | 5/1996 | Takagi et al. | |
| 5,585,709 A * | 12/1996 | Jansen et al. | 318/807 |
| 5,866,998 A | 2/1999 | Menegoli | |
| 5,920,162 A | 7/1999 | Hanson et al. | |
| 5,969,491 A | 10/1999 | Viti et al. | |
| 5,986,419 A | 11/1999 | Archer et al. | |
| 6,100,656 A | 8/2000 | El-Sadi et al. | |
| 6,157,150 A | 12/2000 | Konecny | |
| 6,163,127 A * | 12/2000 | Patel et al. | 318/700 |
| 6,196,650 B1 | 3/2001 | Inagaki | |
| 6,301,136 B1 | 10/2001 | Huggett et al. | |
| 6,396,229 B1 | 5/2002 | Sakamoto et al. | |
| 6,924,617 B2 * | 8/2005 | Schulz et al. | 318/701 |
| 2002/0185986 A1 * | 12/2002 | Seki | 318/599 |

(Continued)

FOREIGN PATENT DOCUMENTS

EP 0 482 913 A2 4/1992

(Continued)

OTHER PUBLICATIONS

Takashi Aihara et al., "Sensorless Torque Control of Salient-Pole Synchronous Motor at Zero-Speed Operation," IEEE Transactions on Power Electronics, vol. 14, No. 1, Jan. 1999, pp. 202-208.

*Primary Examiner*—John Barlow
*Assistant Examiner*—Jonathan Moffat
(74) *Attorney, Agent, or Firm*—Birch, Stewart, Kolasch & Birch, LLP

(57) ABSTRACT

An adaptive, sensorless position sensing apparatus (250) derives rotor position of a synchronous machine (200). The apparatus (250) comprises a first rotor position deriving unit (300) for generating first rotor position values by applying a first sensorless rotor position calculation technique, which emulates a resolver; a second rotor position deriving unit (400) for generating second rotor position values by applying a second sensorless rotor position calculation technique; and a rotor position result output unit (450) for outputting rotor position results over a range of rotor speeds as a function of the first rotor position values, the second rotor position values, and rotor speed.

26 Claims, 6 Drawing Sheets

U.S. PATENT DOCUMENTS

2004/0052217 A1 3/2004 Anghel et al.
2004/0232862 A1* 11/2004 Wogari et al. .............. 318/254
2005/0151502 A1* 7/2005 Quirion ..................... 318/715

FOREIGN PATENT DOCUMENTS

| EP | 0 558 261 B1 | 5/1997 |
|---|---|---|
| EP | 0 575 140 B1 | 8/1997 |
| EP | 0 909 014 B1 | 7/2002 |

* cited by examiner

ADAPTIVE POSITION SENSING METHOD AND APPARATUS FOR SYNCHRONOUS MOTOR GENERATOR SYSTEM

FIELD OF THE INVENTION

The present invention relates to synchronous machines, and more particularly to an adaptive, sensorless method and apparatus for detecting rotor position in a synchronous motor generator system over a full speed range of the motor generator.

BACKGROUND OF THE INVENTION

A conventional motor generator system, as utilized for example in the aerospace industry, includes a brushless synchronous machine that generates multi-phase AC power from a rotating shaft, e.g., coupled to a gas turbine engine, and DC excitation. In addition to operating in a generator mode, the brushless synchronous machine operates as a starter (motor) to start the aircraft engine. Following a successful engine start the system initiates the generator mode.

Conventionally, motor controllers for applications requiring a controlled torque use discrete sensors to determine rotor position in a rotating machine. This technique, however, increases system complexity and decreases system reliability. The electric machine must have a sensor built in or attached mechanically to the rotor. Interfaces and wiring must be added for control (excitation) and feedback signals between the controller and the sensor. Typical sensors include resolvers, encoders, and the like. The location of the rotating machine could be far from the controller, creating the need for unwanted extra wiring in the system.

A conventional motor control system having a position sensor is shown in FIG. 1A. The primary components of the system include a power source 110, a controller 120, a motor generator 130 and a speed/position sensor 140. The controller 120 includes inverter control 126 that receives signals from the sensor 140 (e.g., speed/rotor position) and the motor generator 130 (e.g., current, voltage). These signals are used to control the main inverter 122 and exciter inverter 124, thereby providing a conventional closed loop system to regulate the current as a function of the speed of the motor generator 130, as will be appreciated by those skilled in the art.

FIG. 1B illustrates a block diagram of a sensorless system. As is apparent from the block diagram, the sensor and related signals to the controller 120 are absent. Those skilled in the art will appreciate that this requires the controller 120 to process the rotor position/speed of the motor generator 130 to allow closed loop current regulation or to execute certain control functions (e.g., current control) or operate in an open loop mode.

Sensorless motor control techniques can increase system reliability and eliminate the need for extra wiring in the system. In addition these techniques eliminate the need for a discrete position sensor and also reduce the system cost. A sensorless motor control technique is a more flexible/adaptable solution for a motor drive system than one that relies on a separate position sensor. It is particularly valuable for an aircraft system where increased reliability and reduction of weight (e.g., through elimination of the sensor and additional wiring) are extremely important.

Motor controller applications in systems with existing electrical machines can use a sensorless motor control scheme. For example, sensorless control systems are advantageous in retrofit applications, where a sensor and appropriate wiring may be unavailable and not easily installed. Some of these systems have synchronous generators that can be used as a motor generator but they do not have discrete sensors. Additional applications for this technique include motor controllers in the environmental control systems, electric power systems, industrial drive systems, and the like.

One known sensorless technique for determining rotor position observes back EMF voltage, which may be defined as $E_{emf} = k\, w \sin \alpha$, where k is a constant, w is the angular speed of the motor, and $\alpha$ is the electrical phase angle of the rotor.

However, although observing back EMF to derive rotor position does not rely on a dedicated sensor, such a technique is not well suited for providing initial position sensing at standstill (zero back EMF) or low speed ranges (low signal to noise ratio), which is necessary at start-up under high load torque of the motor generator.

SUMMARY OF THE INVENTION

Aspects of the present invention include a method and an apparatus for adaptive, sensorless determination of rotor position of a brushless synchronous machine over a full speed range of the machine. In one aspect, the present invention is an adaptive, sensorless position sensing apparatus for deriving rotor position of a synchronous machine, the apparatus comprising a first rotor position deriving unit for generating first rotor position values by applying a first sensorless rotor position calculation technique, which emulates a resolver; a second rotor position deriving unit for generating second rotor position values by applying a second sensorless rotor position calculation technique; and a rotor position result output unit for outputting rotor position results over a range of rotor speeds as a function of the first rotor position values, the second rotor position values, and rotor speed.

In another aspect, the present invention is an adaptive, sensorless position sensing method for deriving rotor position of a synchronous machine from signals output from the machine, the method comprising generating first rotor position values by applying a first sensorless rotor position calculation technique, which emulates a resolver; generating second rotor position values by applying a second sensorless rotor position calculation technique; and outputting rotor position results over a range of rotor speeds as a function of the first rotor position values, the second rotor position values, and rotor speed.

BRIEF DESCRIPTION OF THE DRAWINGS

Other aspects of the present invention will become apparent from the following description taken in conjunction with the accompanying drawings, in which.

DETAILED DESCRIPTION

Embodiments of the present invention are more specifically set forth in the following description, with reference to the appended drawings. In the following description and accompanying drawings like elements are denoted with similar reference numbers. Further, well-known elements and related explanations are omitted so as not to obscure the inventive concepts presented herein.

U.S. patent application Ser. No. 10/244,496 ("the '496 application"), filed Sep. 16, 2002 and titled "Position Sensor Emulator for a Synchronous Motor/Generator," which discloses embodiments for deriving rotor position information from phase voltage signals output by main generator stator windings (stator phase windings) of a synchronous motor generator, is incorporated herein by reference in its entirety.

Figure 1A:
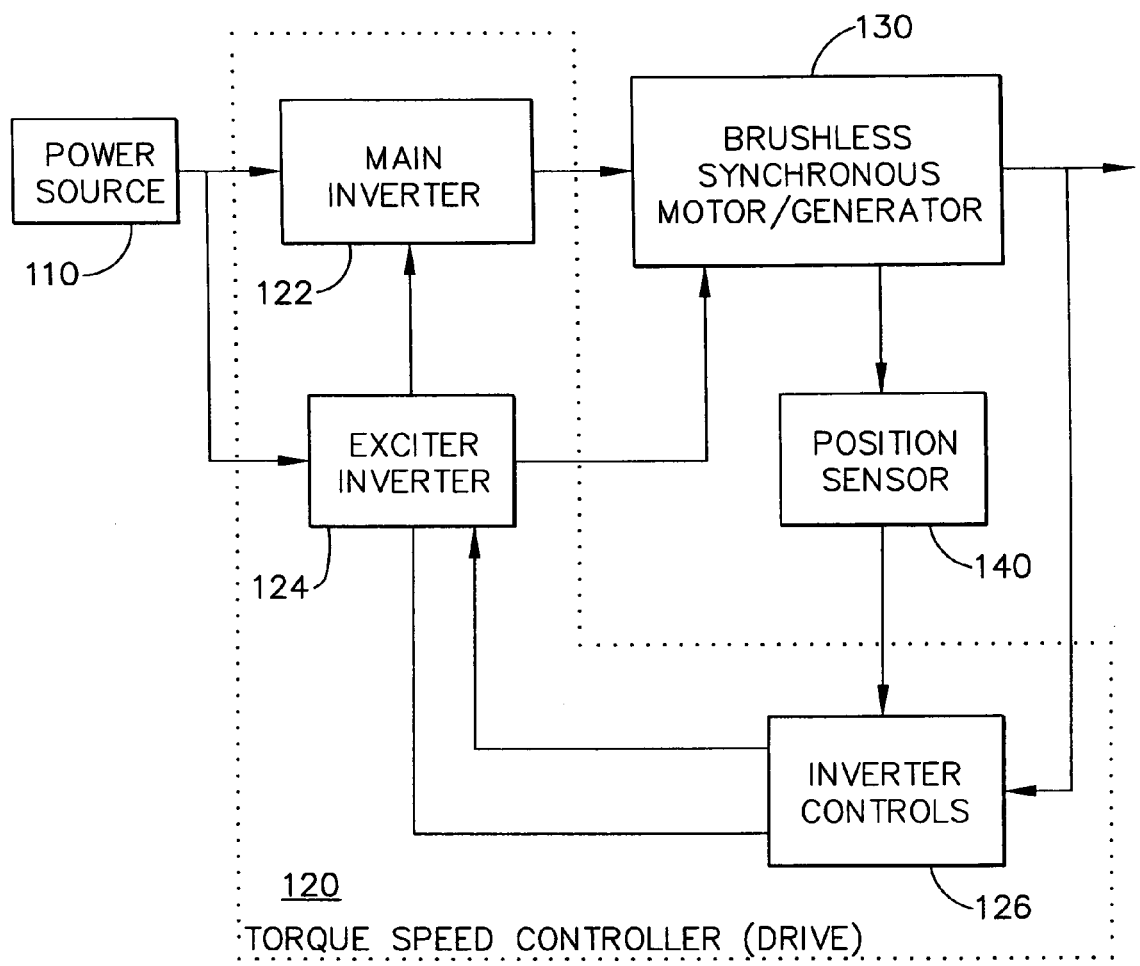
FIG. 1A is a general block diagram of a conventional motor generator system using a position sensor to determine rotor position for motor generator control.
Figure 1B:
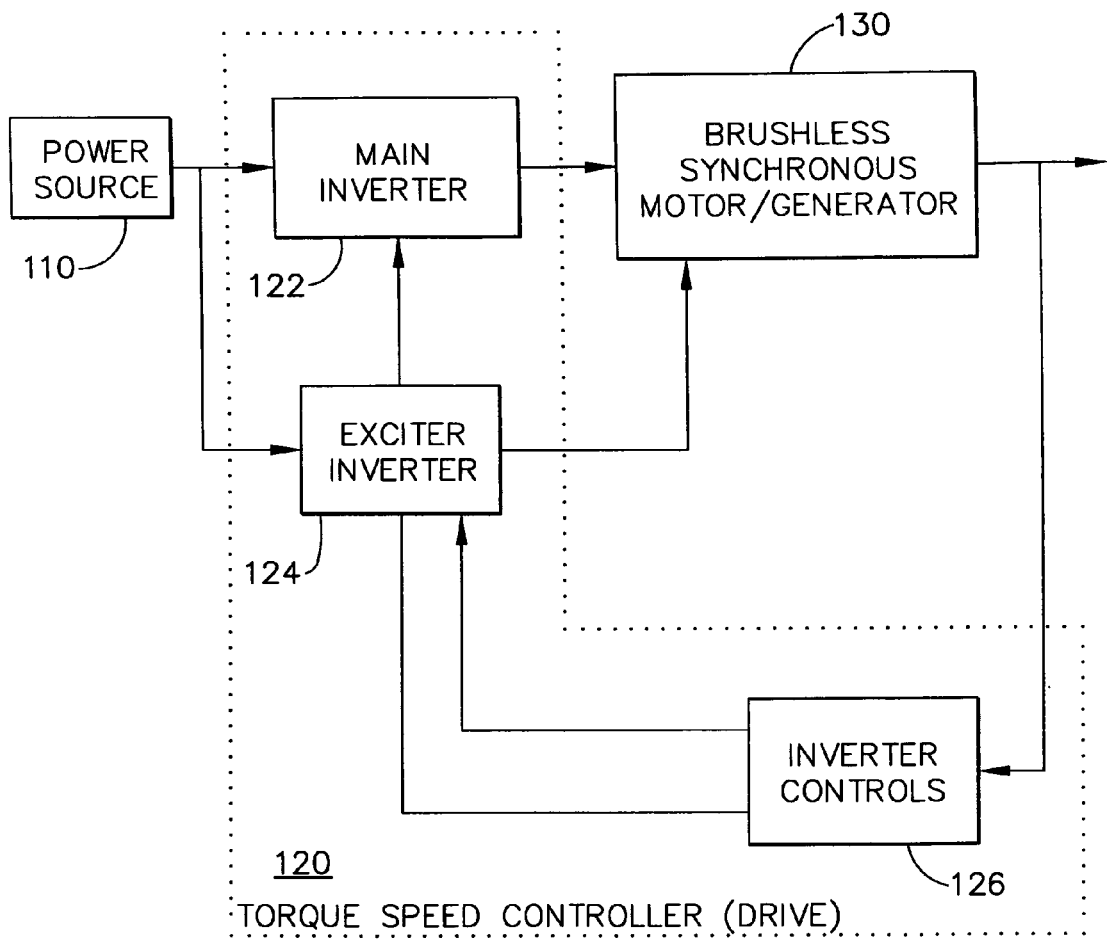
FIG. 1B is a general block diagram of a conventional sensorless motor generator system.
Figure 2:
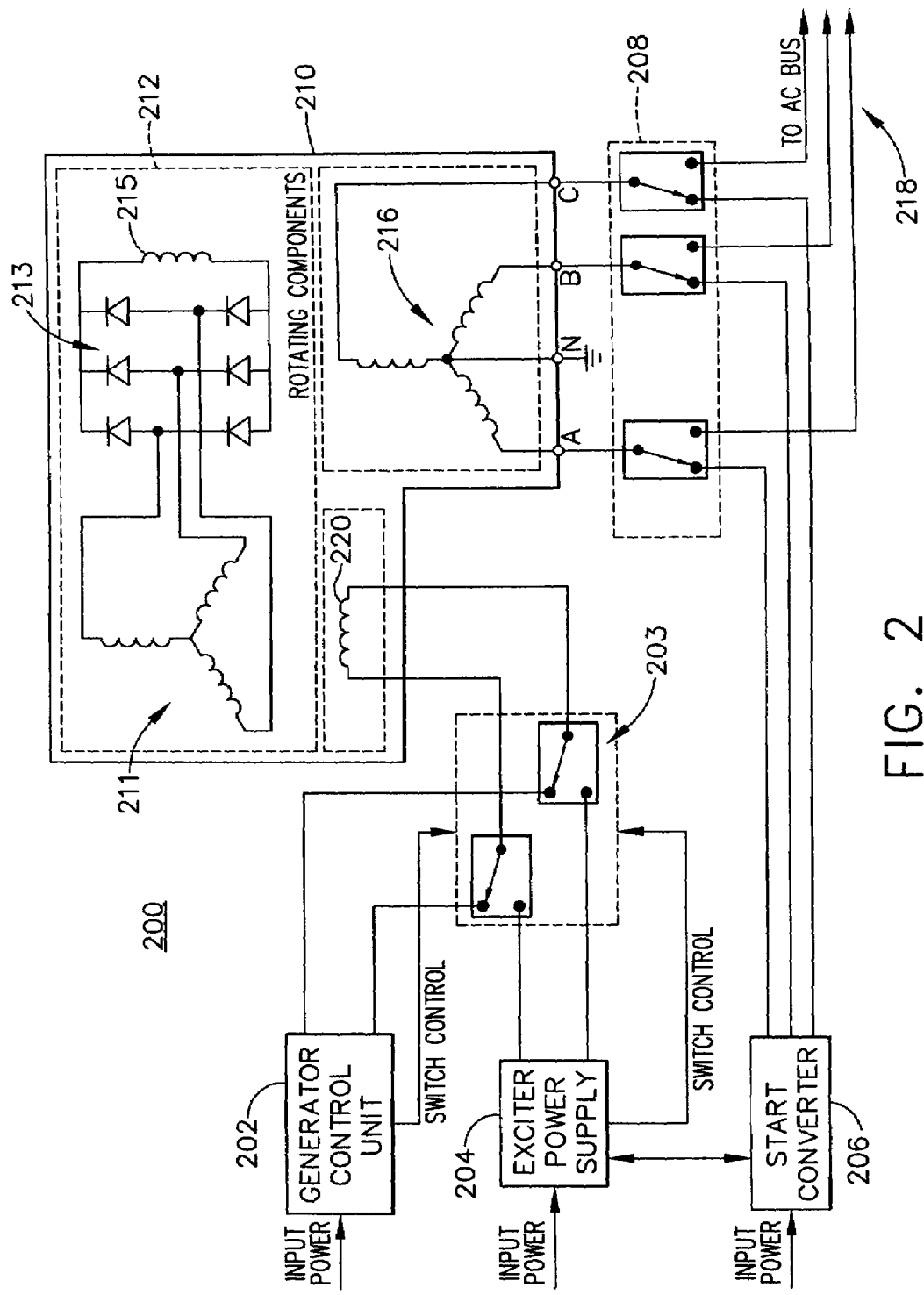
FIG. 2 illustrates a synchronous motor generator system to which principles of the present invention may be applied to determine rotor position over a full speed range.

FIG. 2 illustrates a synchronous motor generator system 200 to which principles of the present invention may be applied to derive rotor position from signals output from stator phase windings. The synchronous motor generator system 200 includes the following main components: a brushless synchronous motor generator 210; a generator control unit 202; an exciter power supply 204; and a start converter 206. The motor generator system 200 further includes motor generator switching units 203, 208, for switching between a generator mode and a motor (starter) mode for the synchronous motor generator 210.

The synchronous motor generator 210 includes a rotating unit 212, including three-phase exciter windings 211, a rectifier bridge 213, and a main generator field winding 215, mounted on a rotatable shaft, e.g., coupled to a gas turbine engine of an aircraft. The synchronous motor generator 210 further includes stator components, including an exciter field winding 220 and three-phase main generator windings 216. The exciter field winding 220 of the stator and the three-phase exciter windings 211 of the rotor constitute an exciter generator and the field winding 215 of the rotor 212 and the three-phase windings 216 of the stator constitute a main generator.

In generator mode, the motor generator switching units 203, 208, which may be for example well known switching elements, are positioned so the generator control unit 202 is connected to supply DC current ("DC excitation") to the exciter field winding 220 (via switch 203) and the outputs, A, B, C, of the three-phase generator windings 216 are connected to an AC bus 218 (via switch 208). In an exemplary embodiment, when DC excitation is supplied to DC winding 220, rotation of the generator shaft (not shown) by the aircraft engine causes the generation of a polyphase voltage in the armature winding 211 that is rectified by the rectifier assembly 213 and coupled to the winding 215. This rectified voltage sets up a DC field in the main rotor field winding 215 which causes a rotating magnetic field in the main stator coil 216 that produces output power with regulated voltage at a point of regulation (POR) 208 (prior to the bus contact switch) for delivery to AC bus 218 via terminals A, B, C, and switch 208. The DC current flowing through the exciter field winding 220 may be varied in amplitude to achieve the desired AC power on the AC bus 218. In generate mode, rotor position information is not required by the system 200.

Additionally, the system 200 may use the starter/generator 210 as a motor to start the aircraft engine. An external power source (exciter power supply—EXPS) 204 is coupled to the generator 210 using the exciter field winding 220. The coupled power from EXPS 204 induces AC power through transformer effect in the polyphase winding 211 of the rotor 212 because no relative motion between rotor and stator exists at zero speed. The AC power established in winding 211 may be rectified by rectifier assembly 213 to generate DC power in the main field winding 215. Additionally, a start converter 206 is used to supply controlled AC power to main stator coil 216 such that sufficient torque is produced by the starter/generator 210. This torque is produced by the interaction between the flux in the main rotor winding 215 and the current (flux) established in coil 216. The frequency of the controlled AC power supplied to the main stator is increased from 0 Hz (0 RPM) to a predetermined frequency corresponding to the generated torque for starter/generator 210 at the end of start. The phase of the current for the supplied AC power input is controlled as function of rotor position to develop the desired torque for starter/generator 210. To create sufficient torque for efficiently moving the rotor via electromagnetic force, commutation of stator phase windings 216 requires that the position of the rotor be known.

Instead of using a resolver or some other dedicated position-sensor to determine rotor position and control commutation, embodiments of the present invention rely on a combination of sensorless techniques to adaptively determine rotor position over a full speed range of the synchronous motor generator system 200.

Figure 3:
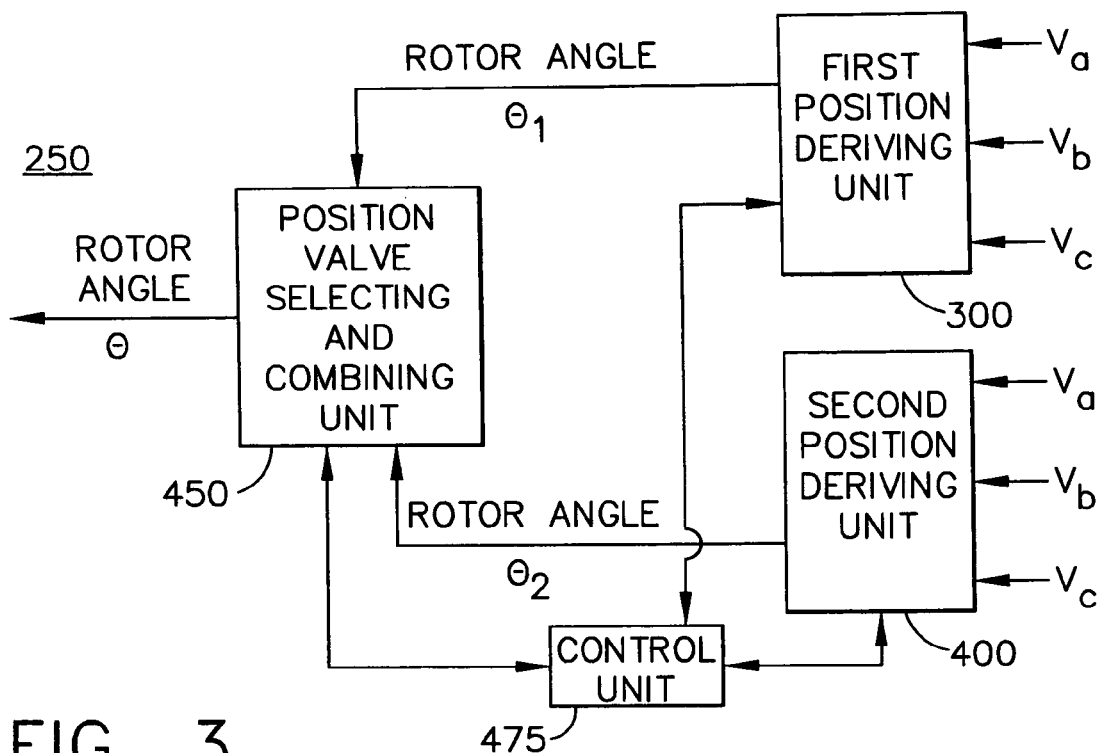
FIG. 3 is a block diagram of an adaptive, sensorless position deriving apparatus according to an embodiment of the present invention.

FIG. 3 illustrates an adaptive, sensorless rotor position determining apparatus 250 according to an embodiment of the present invention. The position determining apparatus 250 may be implemented as a component of the start converter 206. In this embodiment, the rotor position determining apparatus 250 includes: a first position deriving unit 300; a second position deriving unit 400; a position value selecting and combining unit 450; and a control unit 475. Although the elements of the position determining apparatus 250 are shown as discrete elements in FIG. 3, such an illustration is for ease of description, and it should be recognized that the functions performed by these elements may be combined in one or more devices, e.g., implemented in software, hardware, and/or application-specific integrated circuitry (ASIC). In accordance with principles of the present invention, the control unit 475 controls elements of the position determining apparatus 250 to adaptively operate in multiple control phases over a full range of machine speeds. In these control phases, the value selecting and combining unit 450 outputs rotor position values generated by the first position deriving unit 300 (rotor angle $\theta_1$), rotor position values generated the second position deriving unit 400 (rotor angle $\theta_2$), or a weighted combination of $\theta_1$ and $\theta_2$. An embodiment of the present invention is described below, with reference to FIGS. 5–6, in which the rotor position determining apparatus 250 executes four control phases from rotor standstill to full speed during start up to determine rotor position. It should be recognized that the scope of the present invention is not limited to such a four control phase embodiment, since various alternatives are possible, including additional control phases.

1. Control Phase 1

Figure 5A:
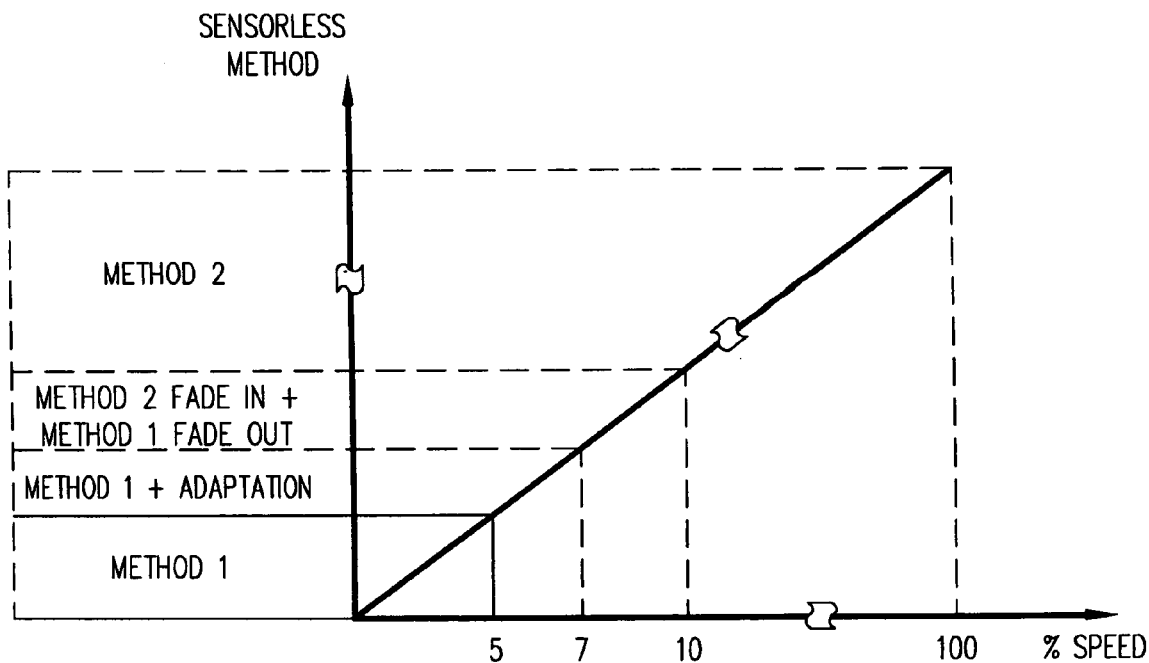
FIGS. 5A–5B illustrate an adaptive technique for sensorless determination of rotor position over a full range of machine speeds in accordance with an embodiment of the present invention.
Figure 6A:
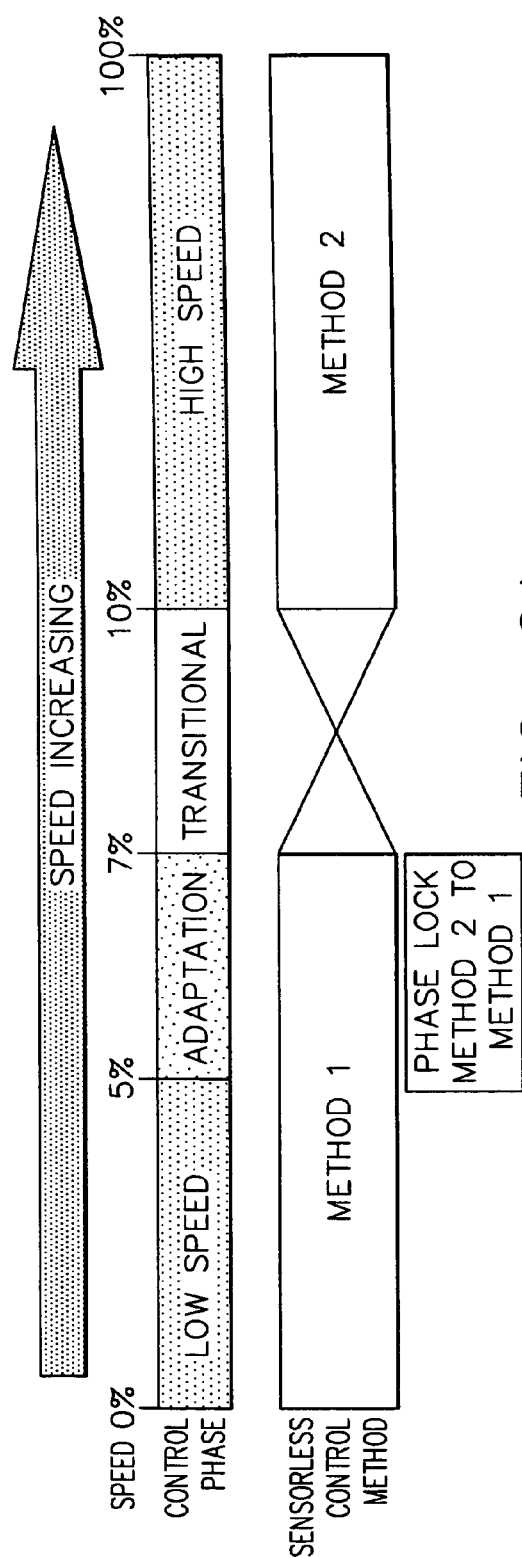
FIGS. 6A–6B further illustrate aspects of an adaptive, sensorless technique for determining rotor position in accordance with principles of the present invention.

At standstill and low rotation speeds (e.g., up to 5% of maximum speed, as shown in FIGS. 5A and 6A), the position value selecting and combining unit 450 selects the output of the first position deriving unit 300. This is referred to as control phase 1. In one implementation, the first position deriving unit 300 takes advantage of the fact that signals output by the main generator windings 216 when AC current is applied to the exciter field winding 220 contain a rotor position-dependent component that can be extracted and processed to emulate voltages induced in sine and cosine pickup windings of a resolver. The '496 Application discloses multiple embodiments that emulate a resolver by extracting and processing such signals for controlling a synchronous motor generator system, such embodiments being incorporated herein by reference.

Figure 4:
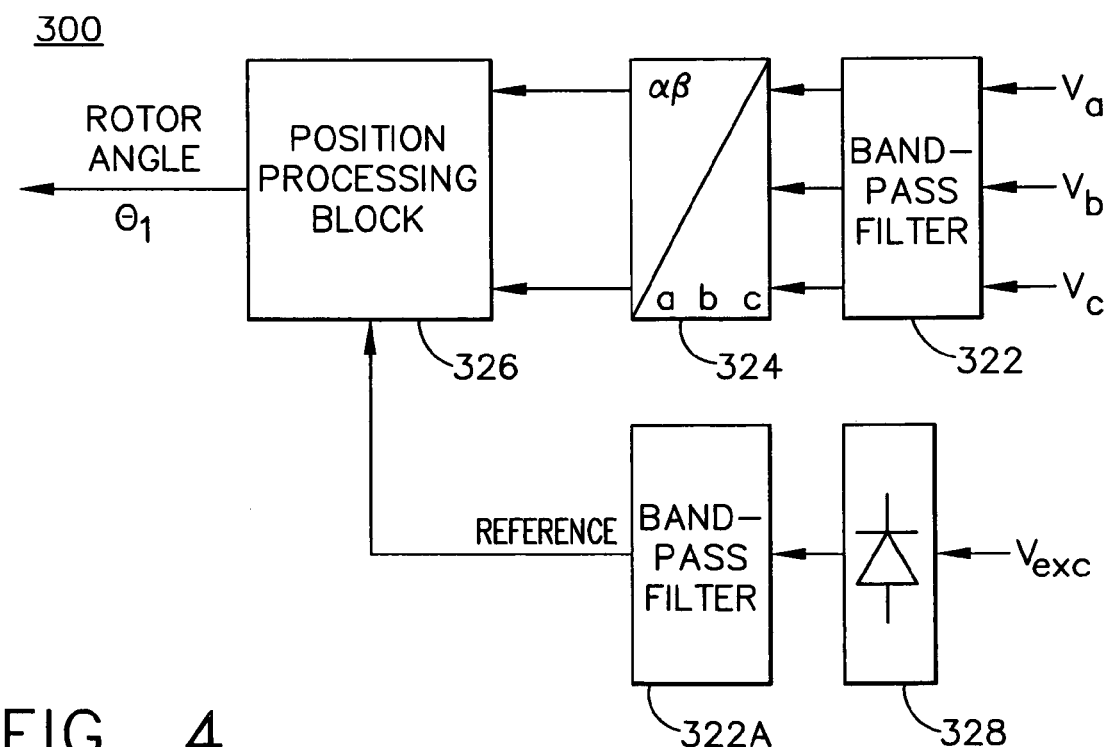
FIG. 4 is a block diagram of a position deriving unit used to derive rotor speed at standstill and lower speeds according to an embodiment of the present invention.

FIG. 4 illustrates a block diagram of the first position deriving unit 300 according to an embodiment of the present invention. As seen in FIG. 4, the first position deriving unit 300 includes: a bandpass filter 322; a converter 324; and a position processor 326. The position sensor emulator 300 of this embodiment further includes a rectifier 328 and a second bandpass filter 322A. Operation of the first position deriving unit 300 according to this implementation will be described below. As described above, when the starter mode is initiated, controlled AC power from the exciter power supply 204 is applied to the field winding 220 of the motor generator 210 resulting in the main rotor behaving as a position sensor, due to its salient construction. This reaction is similar to a resolver-type position sensor. Accordingly, the first position deriving unit 300 continuously detects the voltages on the main stator phase windings 216, $V_A$, $V_B$, $V_C$, to produce a set of signals that define the rotor position. The position information is obtained from the stator phase voltages of the motor generator after being filtered by the bandpass filter 322 and converted by converter 324. For example, converter 324 can use the well known Clarke transformation (a,b,c/α,β) that converts three-phase quantities (a,b,c) into balanced two-phase quadrature quantities (α,β). The output signals from the converter 324 are fed to a position processing block 326 for determining rotor position by relying on the fact that the extracted two-phase quadrature quantities emulate the voltages induced in sine and cosine pickup windings of a resolver. The exciter voltage from the exciter power supply 204 is passed through rectifier 328 and bandpass filter 322A to provide a reference signal, as described for example in the '496 Application.

Those skilled in the art will appreciate that the first position deriving unit 300 may include additional elements. The position sensor emulator 300 of the present invention extracts signals that emulate signals of a resolver. Therefore, the position processing block 326 can be a conventional position processing block. The position information is then used to control the start converter 206. The inventors of this application have found that, although the above-described resolver emulation technique is well suited for standstill and low speed operations, it is less suited for higher rotation speeds typically experienced during start up of a brushless synchronous machine. Therefore, the present invention adaptively utilizes at least one alternate sensorless rotor position determining technique at increasing rotor speeds.

2. Control Phase 2

As machine speed increases, a second control phase (control phase 2, e.g., at 5%–7% of full speed, as seen in FIGS. 5A, 6A) is initiated, in which the position value selecting and combining unit 450 continues to output rotor angle $\theta_1$, while at the same time the second position deriving unit 400 calculates rotor angle $\theta_2$. The control unit 475 performs a phase-locked loop function to adjust/adapt the calculation performed by the second position deriving unit 400 to minimize the error between $\theta_1$ and $\theta_2$. For example, the second position deriving unit 400 may implement a known technique for deriving rotor position based on monitoring back EMF, and the control unit 475 may change a variable in this calculation (e.g., the theoretical value of the mutual inductance between the rotor and stator of the machine) to minimize the error between $\theta_1$ and $\theta_2$. This phase-locked loop operation reduces transient conditions upon switching to $\theta_2$ as the output of the position value selecting and combining unit 450.

3. Control Phase 3

Figure 5B:
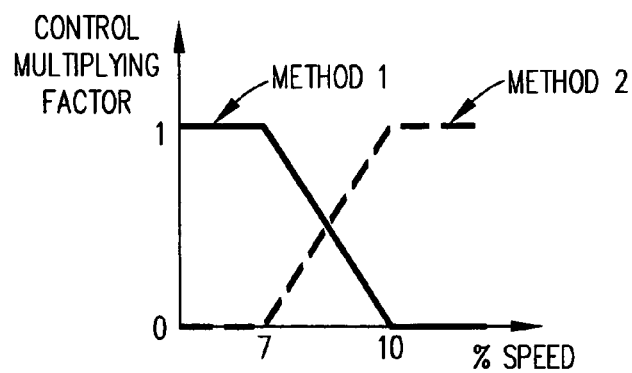

As machine speed increases further, a third control phase (control phase 3, e.g., at 7%–10% of full speed, as seen in FIGS. 5A, 6A) is initiated. During control phase 3, the position value selecting and combining unit 450 combines $\theta_1$ and $\theta_2$ in a weighted manner, to ensure a smooth transition from $\theta_1$ and $\theta_2$. More specifically, the position value selecting and combining unit 450 may calculate:

$$\theta = \theta_1 \cdot k_1 + \theta_2 \cdot k_2,$$

where $k_1 + k_2 = 1$. The value $k_1$ steadily decreases as rotation speed increases during control phase 3 so that a gradual transition from $\theta_1$ to $\theta_2$ is made. This transition phase is illustrated in FIG. 5B. This type of weighting operation has been described, for example by Aihara et al., Sensorless Torque Control of Salient Pole Synchronous Motor at Zero Speed Operations, IEEE Transactions on Power Electronics, Vol. 14, No. 1, January 1999.

4. Control Phase 4

As machine speed increases further, a fourth control phase (control phase 4, e.g., 10%–100% of full speed, as seen in FIGS. 5A, 6A) is initiated. In control phase 4, the position value selecting and combining unit 450 outputs rotor angle $\theta_2$ as the rotor position value.

Figure 6B:
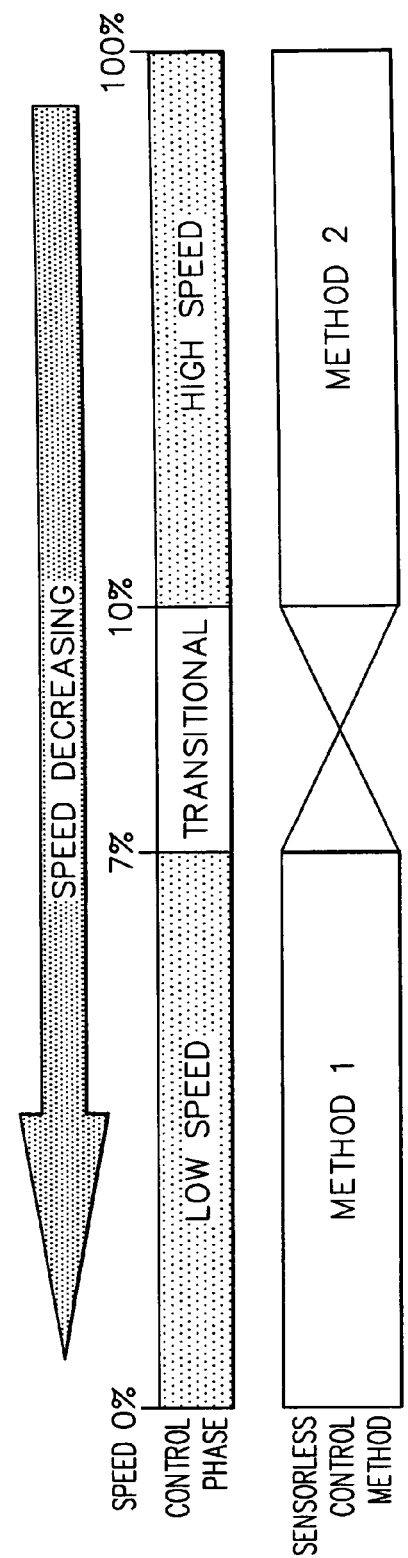

As illustrated in FIG. 6B, during slow down, a transition back to $\theta_1$ is performed, although it is not necessary to implement control phase 2 during slow down.

In accordance with principles of the present invention described above, a first sensorless rotor position deriving technique is applied at standstill and low machine speeds to take advantage of the suitability of such a method for deriving rotor position under such conditions and a second sensorless rotor position deriving technique is applied at higher speeds to take advantage of the suitability of such an alternative technique at such speeds. Although an embodiment described above applied back EMF as the second sensorless rotor position deriving technique, other sensorless techniques may be applied, such as a floating-frame-based technique as disclosed by Huggett et al. in U.S. Pat. No. 6,301,136, which is hereby incorporated herein by reference.

The foregoing illustrates the principles of the invention. It will be appreciated by those skilled in the art will that various arrangements of the present invention can be designed. For example, the band of the bandpass filter and converter can be implemented in analog, digital, or hybrid configurations. Those skilled in the art will appreciate that the bandpass filter, converter, etc., can be implemented in software and/or hardware or in a single device such as an application specific integrated circuit (ASIC). Those skilled in the art will appreciate that the ranges can be optimized based upon the specific requirements of the system and design of the synchronous machine (e.g., number of poles, and the like), which form the basis for calculating the appropriate passband frequencies. Therefore, the scope of the invention is not limited by the foregoing description but is defined solely by the appended claims.

What is claimed is:

1. An adaptive, indirect position sensing apparatus for deriving rotor position of a synchronous machine, said apparatus comprising:
   a first rotor position deriving unit for generating first rotor position values by applying a first indirect rotor position calculation technique, which emulates a resolver, wherein said first indirect rotor position calculation technique generates first rotor position values by filtering an output of said synchronous machine based on a frequency component of excitation supplied to a field winding of the synchronous machine rotor, said synchronous machine also including a main stator coil that receives multi-phase AC power, which is separate from said AC excitation supplied to said field winding, to drive movement of said rotor;
   a second rotor position deriving unit for generating second rotor position values by applying a second indirect rotor position calculation technique; and
   a rotor position result output unit for outputting rotor position results over a range of rotor speeds as a function of said first rotor position values, said second rotor position values, and rotor speed.

2. The position sensing apparatus of claim 1, further comprising:
   a control unit for controlling said rotor position result output unit as a function of rotor speed.

3. The position sensing apparatus of claim 1, wherein
   said rotor position result output unit outputs said first rotor position values as rotor position results during a first operating mode, and
   said rotor position result output unit outputs said second rotor position values as rotor position results during a second operating mode.

4. The position sensing apparatus of claim 3, wherein said rotor position result output unit operates in said first operating mode at low rotor speeds and operates in said second operating mode at higher rotor speeds.

5. The position sensing apparatus of claim 3, wherein
   said apparatus further comprises a control unit for controlling said rotor position result output unit as a function of rotor speed,
   said rotor position result output unit outputs said first rotor position values as rotor position results during a third operating mode, and
   said control unit executes a phase-locked loop operation to control said second rotor position deriving unit during said third operating mode, such that errors between second rotor position values and first rotor position values are reduced.

6. The position sensing apparatus of claim 3, wherein said rotor position result output unit outputs a weighted combination of first and second rotor position values during a transitional operating mode.

7. The position sensing apparatus of claim 6, wherein said rotor position result output unit operates in said transitional operating mode over a range of rotor speeds, such that second rotor position values are given more weight as rotor speed increases.

8. The position sensing apparatus of claim 1, wherein said first rotor position deriving unit comprises:
   a bandpass filter that filters phase voltage signals output from main stator windings of said synchronous machine during AC excitation, thereby extracting a rotor position-indicating component from said phase voltage signals; and
   a converter that converts the filtered phase voltages into balanced two-phase quadrature signals, said balanced two-phase quadrature signals indicating positioning of said rotor.

9. The position sensing apparatus of claim 1, wherein said synchronous machine is a synchronous brushless machine.

10. The position sensing apparatus of claim 1, wherein said rotor is on a shaft coupled to a gas turbine engine of an aircraft.

11. The position sensing apparatus of claim 8, wherein the two-phase quadrature signals are used as inputs to emulate a position sensor in a drive system for the synchronous machine.

12. The position sensing apparatus of claim 11, wherein the two-phase quadrature signals are used as inputs to emulate a resolver.

13. The position sensing apparatus of claim 1, wherein said second indirect rotor position calculation technique calculates rotor position based on back EMF.

14. An adaptive, indirect position sensing method for deriving rotor position of a synchronous machine from signals output from said machine, said method comprising:
   generating first rotor position values by applying a first indirect rotor position calculation technique, which emulates a resolver, wherein said first indirect rotor position calculation technique generates first rotor position values by filtering an output of said synchronous machine based on a frequency component of an of AC excitation supplied to a field winding of the synchronous machine rotor, said synchronous machine also including a main stator coil that receives multi-phase AC power, which is separate from said AC excitation supplied to said field winding, to drive movement of said rotor;
   generating second rotor position values by applying a second indirect rotor position calculation technique; and
   outputting rotor position results over a range of rotor speeds as a function of said first rotor position values, said second rotor position values, and rotor speed.

15. The position sensing method of claim 14, further comprising:
   controlling said outputting step as a function of rotor speed.

16. The position sensing method of claim 14, wherein
   said outputting step outputs said first rotor position values as rotor position results during a first operating mode and outputs said second rotor position values as rotor position results during a second operating mode.

17. The position sensing method of claim 16, wherein said first operating mode is executed at low rotor speeds and said second operating mode is executed at higher rotor speeds.

18. The position sensing method of claim 16, wherein
   said rotor position output unit outputs said first rotor position values as rotor position results during a third operating mode, and
   said method further comprises executing a phase-locked loop operation during said third operating mode to reduce errors between second rotor position values and first rotor position values.

19. The position sensing method of claim 16, wherein said outputting step outputs a weighted combination of first and second rotor position values during a transitional operating mode.

20. The position sensing method of claim 19, wherein said outputting step operates in said transitional operating mode over a range of rotor speeds, such that second rotor position values are given more weight as rotor speed increases.

21. The position sensing method of claim 14, wherein said first indirect rotor position calculation technique comprises:
bandpass filtering phase voltage signals output from main stator windings of said synchronous machine during AC excitation, thereby extracting a rotor position-indicating component from said phase voltage signals; and
converting the filtered phase voltages into balanced two-phase quadrature signals, said balanced two-phase quadrature signals indicating positioning of said rotor.

22. The position sensing method of claim 14, wherein said synchronous machine is a synchronous brushless machine.

23. The position sensing method of claim 14, wherein said rotor is on a shaft coupled to a gas turbine engine of an aircraft.

24. The position sensing method of claim 21, wherein the two-phase quadrature signals are used as inputs to emulate a position sensor in a drive system for the synchronous machine.

25. The position sensing method of claim 24, wherein the two-phase quadrature signals are used as inputs to emulate a resolver.

26. The position sensing method of claim 14, wherein said second indirect rotor position calculation technique calculates rotor position based on back EMF.

* * * * *